United States Patent
Lavoie et al.

(10) Patent No.: US 9,809,250 B2
(45) Date of Patent: Nov. 7, 2017

(54) INTUITIVE DRIVER INTERFACE FOR TRAILER BACKUP ASSIST

(71) Applicant: Ford Global Technologies, LLC, Dearborn, MI (US)

(72) Inventors: Erick Michael Lavoie, Dearborn, MI (US); Douglas Scott Rhode, Farmington Hills, MI (US); Matthew Y. Rupp, Canton, MI (US); David Dean Smit, Ann Arbor, MI (US); Thomas Edward Pilutti, Ann Arbor, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 14/599,625

(22) Filed: Jan. 19, 2015

(65) Prior Publication Data

US 2015/0134183 A1 May 14, 2015

Related U.S. Application Data

(63) Continuation of application No. 13/336,042, filed on Dec. 23, 2011, now Pat. No. 8,972,109.
(Continued)

(51) Int. Cl.
*B62D 13/06* (2006.01)
*B60W 30/18* (2012.01)
(Continued)

(52) U.S. Cl.
CPC ....... *B62D 13/06* (2013.01); *B60W 30/18036* (2013.01); *B62D 15/027* (2013.01);
(Continued)

(58) Field of Classification Search
CPC ........ A63H 17/36; A63H 17/40; A63H 18/08; A63H 30/00; B62D 13/06; B62D 15/027;
(Continued)

(56) References Cited

U.S. PATENT DOCUMENTS 3,944,972 A * 3/1976 Chandler ............. B62D 15/027
340/286.02
4,320,267 A 3/1982 Greve et al.
(Continued)

FOREIGN PATENT DOCUMENTS

DE 3923676 A1 1/1991
DE 3931518 A1 4/1991
(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Thomas G Black
*Assistant Examiner* — Sze-Hon Kong
(74) *Attorney, Agent, or Firm* — Raymond Coppiellie; Price Heneveld LLP

(57) ABSTRACT

A trailer backup steering input apparatus is coupled to a vehicle. The trailer backup steering input apparatus comprises a rotatable control element (e.g., a knob) and a rotatable control element movement sensing device. The rotatable control element biased to an at-rest position between opposing rotational ranges of motion. The rotatable control element movement sensing device is coupled to the rotatable control element for sensing movement of the rotatable control element. The rotatable control element movement sensing device outputs a signal generated as a function of an amount of rotation of the rotatable control element with respect to the at-rest position, a rate movement
(Continued)

of the rotatable control element, and/or a direction of movement of the rotatable control element with respect to the at-rest position.

20 Claims, 4 Drawing Sheets

Related U.S. Application Data

(60) Provisional application No. 61/477,136, filed on Apr. 19, 2011.

(51) Int. Cl.
*B62D 15/02* (2006.01)
*B60W 10/20* (2006.01)

(52) U.S. Cl.
CPC ........ *B60K 2350/102* (2013.01); *B60W 10/20* (2013.01); *B60W 2300/14* (2013.01); *B60W 2520/22* (2013.01)

(58) Field of Classification Search
CPC ........... B60W 30/18036; B60W 10/20; B60W 2300/14; B60W 2520/22; B60K 2350/102
See application file for complete search history.

(56) References Cited

U.S. PATENT DOCUMENTS

| | | | |
|---|---|---|---|
| 4,518,044 | A | 5/1985 | Wiegardt et al. |
| 4,848,499 | A | 7/1989 | Martinet et al. |
| 4,947,097 | A | 8/1990 | Tao |
| 4,954,820 | A * | 9/1990 | Kohno .................. A63H 30/04 340/12.5 |
| 5,261,495 | A | 11/1993 | Szymczak |
| 5,270,689 | A | 12/1993 | Hermann |
| 5,313,389 | A | 5/1994 | Yasui |
| 5,359,165 | A | 10/1994 | Leveque et al. |
| 5,430,261 | A | 7/1995 | Malone |
| 5,436,413 | A | 7/1995 | Katakami |
| 5,590,041 | A * | 12/1996 | Cooper ................ B62D 11/183 180/6.2 |
| 5,957,232 | A | 9/1999 | Shimizu et al. |
| 6,065,561 | A * | 5/2000 | Howard .................. B62D 1/16 180/441 |
| 6,389,342 | B1 | 5/2002 | Kanda |
| 6,435,289 | B1 * | 8/2002 | Hori ..................... B62D 11/183 180/315 |
| 6,601,386 | B1 * | 8/2003 | Hori ..................... E02F 9/2004 137/636.2 |
| 6,636,197 | B1 | 10/2003 | Goldenberg et al. |
| 6,750,406 | B2 | 6/2004 | Komatsu et al. |
| 7,038,667 | B1 | 5/2006 | Vassallo et al. |
| 7,085,634 | B2 | 8/2006 | Endo et al. |
| 7,191,865 | B2 | 3/2007 | Spark |
| 7,225,891 | B2 | 6/2007 | Gehring et al. |
| 7,255,061 | B2 | 8/2007 | Denton |
| 7,309,075 | B2 | 12/2007 | Ramsey et al. |
| 7,310,084 | B2 | 12/2007 | Shitanaka et al. |
| 7,315,299 | B2 | 1/2008 | Sunda et al. |
| 7,436,298 | B2 | 10/2008 | Yuasa et al. |
| 7,550,686 | B2 | 6/2009 | Girke et al. |
| 7,553,212 | B2 * | 6/2009 | Yamaguchi .......... A63H 17/262 446/460 |
| 7,827,917 | B1 | 11/2010 | Henderson |
| 7,837,004 | B2 | 11/2010 | Yasuda |
| 7,857,085 | B2 * | 12/2010 | Spark ...................... B60T 8/24 180/236 |
| 8,036,792 | B2 | 10/2011 | Dechamp |
| 8,138,865 | B2 | 3/2012 | North et al. |
| 8,519,948 | B2 | 8/2013 | Cruz-Hernandez et al. |
| 8,755,984 | B2 | 6/2014 | Rupp et al. |
| 8,786,417 | B2 | 7/2014 | Holmen et al. |
| 8,798,860 | B2 | 8/2014 | Dechamp |
| 8,825,328 | B2 | 9/2014 | Rupp et al. |
| 8,909,426 | B2 | 12/2014 | Rhode et al. |
| 8,930,140 | B2 | 1/2015 | Trombley et al. |
| 8,972,109 | B2 | 3/2015 | Lavoie et al. |
| 9,033,284 | B2 | 5/2015 | Van Staagen |
| 9,102,271 | B2 | 8/2015 | Trombley et al. |
| 9,108,598 | B2 | 8/2015 | Headley |
| 9,132,856 | B2 | 9/2015 | Shepard |
| 9,164,955 | B2 | 10/2015 | Lavoie et al. |
| 9,187,124 | B2 | 11/2015 | Trombley et al. |
| 9,238,483 | B2 | 1/2016 | Hafner et al. |
| 9,248,858 | B2 | 2/2016 | Lavoie et al. |
| 9,315,212 | B1 | 4/2016 | Kyrtsos et al. |
| 9,321,483 | B2 | 4/2016 | Headley |
| 9,335,162 | B2 | 5/2016 | Kyrtsos et al. |
| 9,340,228 | B2 | 5/2016 | Xu et al. |
| 9,352,777 | B2 | 5/2016 | Lavoie et al. |
| 9,434,414 | B2 | 9/2016 | Lavoie |
| 2003/0214428 | A1 * | 11/2003 | Tokita .................... A63H 30/04 341/176 |
| 2004/0093139 | A1 | 5/2004 | Wildey et al. |
| 2004/0189595 | A1 | 9/2004 | Yuasa et al. |
| 2005/0000738 | A1 * | 1/2005 | Gehring ............. B62D 15/0285 180/14.1 |
| 2005/0221717 | A1 * | 10/2005 | Quinn .................. A63H 17/002 446/454 |
| 2006/0092129 | A1 | 5/2006 | Choquet et al. |
| 2007/0198190 | A1 | 8/2007 | Bauer et al. |
| 2008/0030361 | A1 | 2/2008 | Peissner et al. |
| 2008/0312792 | A1 | 12/2008 | Dechamp |
| 2009/0101429 | A1 | 4/2009 | Williams |
| 2009/0306854 | A1 * | 12/2009 | Dechamp ............... B62D 13/06 701/41 |
| 2010/0063670 | A1 | 3/2010 | Brzezinski et al. |
| 2010/0152989 | A1 | 6/2010 | Smith et al. |
| 2010/0222964 | A1 | 9/2010 | Dechamp |
| 2011/0060488 | A1 * | 3/2011 | Nakazawa ................ B66F 9/20 701/22 |
| 2011/0149077 | A1 | 6/2011 | Robert |
| 2011/0160956 | A1 | 6/2011 | Chung et al. |
| 2011/0275274 | A1 * | 11/2011 | Dewitt .................... A63H 30/04 446/456 |
| 2012/0030626 | A1 | 2/2012 | Hopkins et al. |
| 2012/0087480 | A1 | 4/2012 | Yang et al. |
| 2012/0185131 | A1 * | 7/2012 | Headley ................. B60D 1/245 701/41 |
| 2012/0271512 | A1 | 10/2012 | Rupp et al. |
| 2012/0271514 | A1 | 10/2012 | Lavoie et al. |
| 2012/0271515 | A1 | 10/2012 | Rhode et al. |
| 2012/0271522 | A1 | 10/2012 | Rupp et al. |
| 2013/0006472 | A1 | 1/2013 | McClain et al. |
| 2013/0024064 | A1 | 1/2013 | Shepard |
| 2013/0158803 | A1 | 6/2013 | Headley |
| 2013/0158863 | A1 | 6/2013 | Skvarce et al. |
| 2013/0193263 | A1 * | 8/2013 | Schweighart .......... B60F 5/02 244/2 |
| 2013/0268160 | A1 | 10/2013 | Trombley et al. |
| 2014/0052337 | A1 | 2/2014 | Lavoie et al. |
| 2014/0058614 | A1 | 2/2014 | Trombley et al. |
| 2014/0058622 | A1 | 2/2014 | Trombley et al. |
| 2014/0058655 | A1 | 2/2014 | Trombley et al. |
| 2014/0058668 | A1 | 2/2014 | Trombley et al. |
| 2014/0088797 | A1 | 3/2014 | McClain et al. |
| 2014/0156148 | A1 | 6/2014 | Kikuchi |
| 2014/0160276 | A1 | 6/2014 | Pliefke et al. |
| 2014/0172232 | A1 | 6/2014 | Rupp et al. |
| 2014/0188344 | A1 | 7/2014 | Lavoie |
| 2014/0188346 | A1 | 7/2014 | Lavoie |
| 2014/0210456 | A1 | 7/2014 | Crossman |
| 2014/0218506 | A1 | 8/2014 | Trombley et al. |
| 2014/0218522 | A1 | 8/2014 | Lavoie et al. |
| 2014/0222288 | A1 | 8/2014 | Lavoie et al. |
| 2014/0236532 | A1 | 8/2014 | Trombley et al. |
| 2014/0249691 | A1 | 9/2014 | Hafner et al. |
| 2014/0267688 | A1 | 9/2014 | Aich et al. |
| 2014/0267689 | A1 | 9/2014 | Lavoie |
| 2014/0267868 | A1 | 9/2014 | Mazzola et al. |
| 2014/0267869 | A1 | 9/2014 | Sawa |

(56) References Cited

U.S. PATENT DOCUMENTS

| | | |
|---|---|---|
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0070161 A1 | 3/2015 | Mizuno et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2016/0039456 A1 | 2/2016 | Lavoie et al. |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0280267 A1 | 9/2016 | Lavoie et al. |
| 2016/0304122 A1 | 10/2016 | Herzog et al. |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |
| EP | 0418653 A1 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

* cited by examiner

INTUITIVE DRIVER INTERFACE FOR TRAILER BACKUP ASSIST

CROSS REFERENCE TO RELATED APPLICATIONS

This patent application is a continuation of U.S. patent application Ser. No. 13/336,042, which was filed on Dec. 23, 2011, entitled "ROTATABLE DRIVER INTERFACE FOR TRAILER BACKUP ASSIST," now U.S. Pat. No. 8,972,109, which claims benefit from U.S. Provisional Patent Application No. 61/477,136, which was filed Apr. 19, 2011, entitled "INTUITIVE DRIVER INTERFACE FOR TRAILER BACKUP ASSIST." The aforementioned related applications are hereby incorporated by reference in their entirety.

FIELD OF THE INVENTION

The disclosures made herein relate generally to steering assist technologies in vehicles and, more particularly, to trailer backup assist system having a rotatable driver interface for controlling a radius of curvature for a trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

Embodiments of the inventive subject matter are directed to trailer backup assist systems that control curvature of a path of a trailer (i.e., a trajectory of the trailer) attached to a vehicle through control of a power assisted steering system (e.g., electric power assisted steering (EPAS) system) of the vehicle. As such, during operation of the trailer backup assist system, a driver of the vehicle is unable to make steering inputs via the steering wheel of the vehicle because the trailer backup assist system is in control of the power assisted steering system and the power assisted steering system is typically directly coupled to the steering wheel. Advantageously, embodiments of the present invention provide a rotatable control element (e.g., a rotary knob) for controlling a curvature of the path of the trailer while it is being backed up. Rotation of the rotatable control element counter-clockwise (e.g., to the left relative to a seated position of the driver of the vehicle) commands the trailer to be steered to the left, rotation of the rotatable control element clockwise (e.g., to the right relative to a seated position of the driver of the vehicle) commands the trailer to be steered to the right, and the rotatable control element being positioned in an at-rest position causes the trailer to be backed along a straight line from the current trailer heading. In this manner, driver inputs for controlling the path of the trailer while the trailer is being backed up are made entirely through the rotatable control element as opposed to being made at the steering wheel of the vehicle. Accordingly, embodiments of the inventive subject matter provide a user-friendly and simple solution to accommodating input of trailer steering information for arbitrary paths by the driver during backing of the vehicle when the vehicle is equipped with such a trailer backup assist system.

In one embodiment of the inventive subject matter, a method comprises a plurality of operations. An operation is performed for receiving trailer angle information from a trailer angle detection apparatus of a vehicle having a trailer attached thereto. The trailer angle information is generated as a function of an angular displacement between the vehicle and the trailer. An operation is performed for receiving trailer steering information from a trailer backup steering input apparatus of the vehicle. The trailer backup steering input apparatus includes a rotational control input device that is biased to an at-rest position between opposing rotational ranges of motion. The trailer steering information is derived from at least one of an amount of rotation of the rotational control input device with respect to the at-rest position, a rate movement of the rotational control input device, and a direction of movement of the rotational control input device with respect to the at-rest position. An operation is performed for controlling a power steering system of the vehicle using vehicle steering information as the trailer is being backed by the vehicle. The vehicle steering information is generated as a function of the trailer angle information and the trailer steering information.

In another embodiment of the inventive subject matter, a trailer backup steering input apparatus is coupled to a vehicle. The trailer backup steering input apparatus comprises a knob and a knob movement sensing device. The knob is biased to an at-rest position between opposing rotational ranges of motion. The knob movement sensing device is coupled to the knob for sensing movement of the knob. The knob movement sensing device outputs a signal generated as a function of an amount of rotation of the knob with respect to the at-rest position, a rate movement of the knob, and/or a direction of movement of the knob with respect to the at-rest position.

In another embodiment of the inventive subject matter, a vehicle comprises a trailer angle detection apparatus, a trailer backup steering input apparatus, and a power-steering assist system. The trailer angle detection apparatus is configured for outputting a signal generated as a function of an angle between the vehicle and a trailer attached to the vehicle. The trailer backup steering input apparatus includes a knob and a knob movement sensing device coupled to the knob for sensing movement of the knob. The knob is biased to an at-rest position between opposing rotational ranges of motion. The knob movement sensing device outputs a signal generated as a function of an amount of rotation of the rotational control input device with respect to the at-rest position, a rate movement of the rotational control input device, and/or a direction of movement of the rotational control input device with respect to the at-rest position. The power-steering assist system is coupled to a trailer angle detection apparatus and the trailer backup steering input apparatus. The power-steering assist system includes a control module structure configured for generating power steering system control information as a function of the trailer angle detection apparatus signal and the backup steering input apparatus signal.

According to one aspect of the present invention, a steering input apparatus for a trailer backup assist system includes a control element manually operable to a select position of a plurality of commanding positions, including a zero curvature position and two positions that directionally oppose the zero curvature position. The steering input apparatus also includes a control module that generates a vehicle steering command based on a commanded trailer path corresponding to the select position of the control element.

According to another aspect of the present invention, a backup assist system for a vehicle reversing a trailer includes an input device having a control element movable to a first position providing a zero curvature command and at least two additional positions providing curvature commands in opposing directions relative to the zero curvature command. The backup assist system also includes a control module that generates a steering command for the vehicle based on a commanded curvature of the trailer provided by the control element.

According to another aspect of the present invention, a method includes the steps of providing a control element movable to a select position of a first position providing a zero curvature command and second and third positions providing curvature commands in opposing directions from the zero curvature command. Also, the method includes the step of determining a hitch angle between a vehicle and a trailer. Further, the method includes the step of generating a steering command for the vehicle based on the hitch angle and a commanded curvature of the trailer provided by the control element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
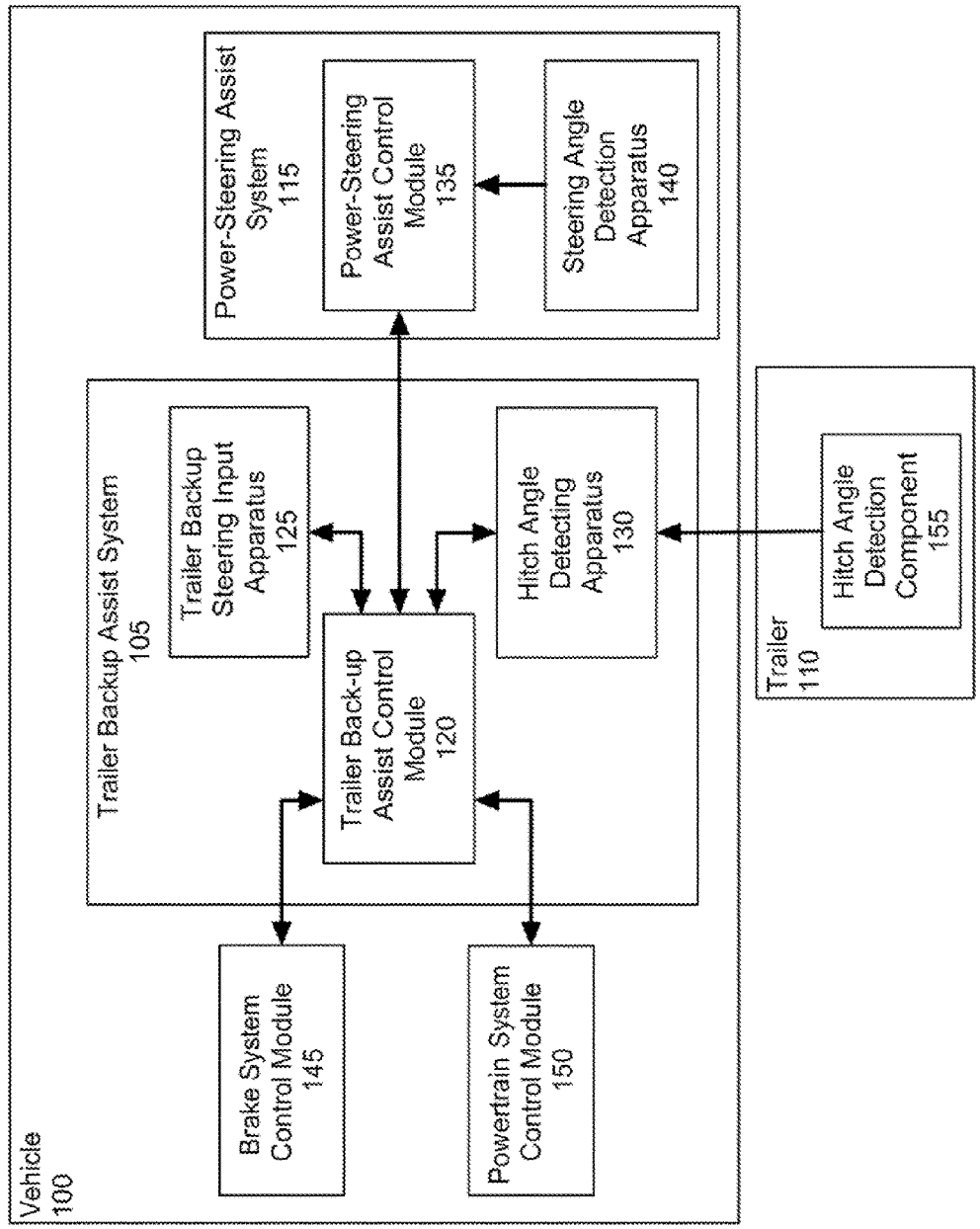
FIG. 1 shows a vehicle configured for performing trailer backup assist functionality in accordance with an embodiment of the inventive subject matter embodiment.

Referring to FIG. 1, an embodiment of a vehicle 100 configured for performing trailer backup assist functionality in accordance with the inventive subject matter is shown. A trailer backup assist system 105 of the vehicle 100 controls the curvature of path of travel of the trailer 110 that is attached to the vehicle 100. Such control is accomplished through interaction of a power assisted steering system 115 of the vehicle 100 and the trailer backup assist system 105. During operation of the trailer backup assist system 105 while the vehicle 100 is being reversed, a driver of the vehicle 100 is limited in the manner in which he/she can make steering inputs via a steering wheel of the vehicle 100 because the trailer backup assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) of the backup assist system 105 is used for commanding changes in curvature of a path of the trailer 110 such as a knob, thereby decoupling such commands from being made at the steering wheel of the vehicle 100.

The trailer backup assist system 105 includes a trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for allowing communication of information therebetween. It is disclosed herein that the trailer backup steering input apparatus can be coupled to the trailer backup assist control module 120 in a wired or wireless manner. The trailer backup assist system control module 120 is attached to a power-steering assist control module 135 of the power-steering assist system 115 for allowing information to be communicated therebetween. A steering angle detecting apparatus 140 of the power-steering assist system 115 is connected to the power-steering assist control module 135 for providing information thereto. The trailer backup assist system is also attached to a brake system control module 145 and a powertrain control module 150 for allowing communication of information therebetween. Jointly, the trailer backup assist system 105, the power-steering assist system 115, the brake system control module 145, the powertrain control module 150 define a trailer backup assist architecture configured in accordance with an embodiment of the inventive subject matter.

The trailer backup assist control module 120 is configured for implementing logic (i.e., instructions) for receiving information from the trailer backup steering input apparatus 125, the hitch angle detecting apparatus 130, the power-steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist system 115 to achieve a commanded path of travel for the trailer 110.

The trailer backup steering input apparatus 125 provides the trailer backup assist control module 120 with information defining the commanded path of travel of the trailer 110 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer backup steering input apparatus 125 preferably includes a rotational control input device for allowing a driver of the vehicle 100 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power-steering assist system configuration that allows a steering wheel to be decoupled from movement of the steered wheels of such a vehicle. Accordingly, the steering wheel can be rotated independent of the manner in which the power-steering assist system of the vehicle controls the steered wheels (e.g., as commanded by vehicle steering information provided by to a power-steering assist system control module from a trailer backup assist system control module configured in accordance with an embodiment of the inventive subject matter). As such, in these types of vehicles where the steering wheel can be selectively decoupled from the steered wheels to allow independent operation thereof, trailer steering information of a trailer backup assist system configured in accordance with the inventive subject matter can be provided through rotation of the steering wheel. Accordingly, it is disclosed herein that in certain embodiments of the inventive subject matter, the steering wheel is an embodiment of a rotational control input device in the context of the inventive subject matter. In such embodiments, the steering wheel would be biased (e.g., by an apparatus that is selectively engagable/activatable) to an at-rest position between opposing rotational ranges of motion.

The hitch angle detecting apparatus 130, which operates in conjunction with a hitch angle detection component 155 of the trailer 110, provides the trailer backup assist control module 120 with information relating to an angle between the vehicle 100 and the trailer 110 (i.e., hitch angle information). In a preferred embodiment, the hitch angle detecting apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detecting apparatus 130. Alternatively, the hitch angle detecting apparatus 130 can be a device that is physically mounted on a hitch component of the vehicle 100 and/or a mating hitch component of the trailer 110 for determining an angle between centerline longitudinal axes of the vehicle 100 and the trailer 110.

The power-steering assist control module 135 provides the trailer backup assist control module 120 with information relating to a rotational position (e.g., angle) of the steering wheel angle and/or a rotational position (e.g., turning angle(s)) of steered wheels of the vehicle 100. In certain embodiments of the inventive subject matter, the trailer backup assist control module 120 can be an integrated component of the power steering assist system 115. For example, the power-steering assist control module 135 can include a trailer backup assist algorithm for generating vehicle steering information as a function of all or a portion of information received from the trailer backup steering input apparatus 125, the hitch angle detecting apparatus 130, the power-steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145. In some instances, individual wheel speeds can also be used to determine a vehicle yaw rate and such yaw rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 100 during backing of the trailer 110. For example, using the trailer backup assist control module 120 to regulate speed of the vehicle 100 during backing of the trailer 110 can reduce the potential for unacceptable trailer backup conditions. Examples of unacceptable trailer backup conditions include, but are not limited to, a vehicle overspeed condition, a trailer jack-knife condition as defined by an angular displacement limit relative to the vehicle 100 and the trailer 110, and the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 100 during backing of the trailer 110. As mentioned above, regulation of the speed of the vehicle 100 is necessary to limit the potential for unacceptable trailer backup conditions such as, for example, jack-knifing. Similar to high-speed considerations as they relate to unacceptable trailer backup conditions, high acceleration can also lead to such unacceptable trailer backup conditions.

Figure 2:
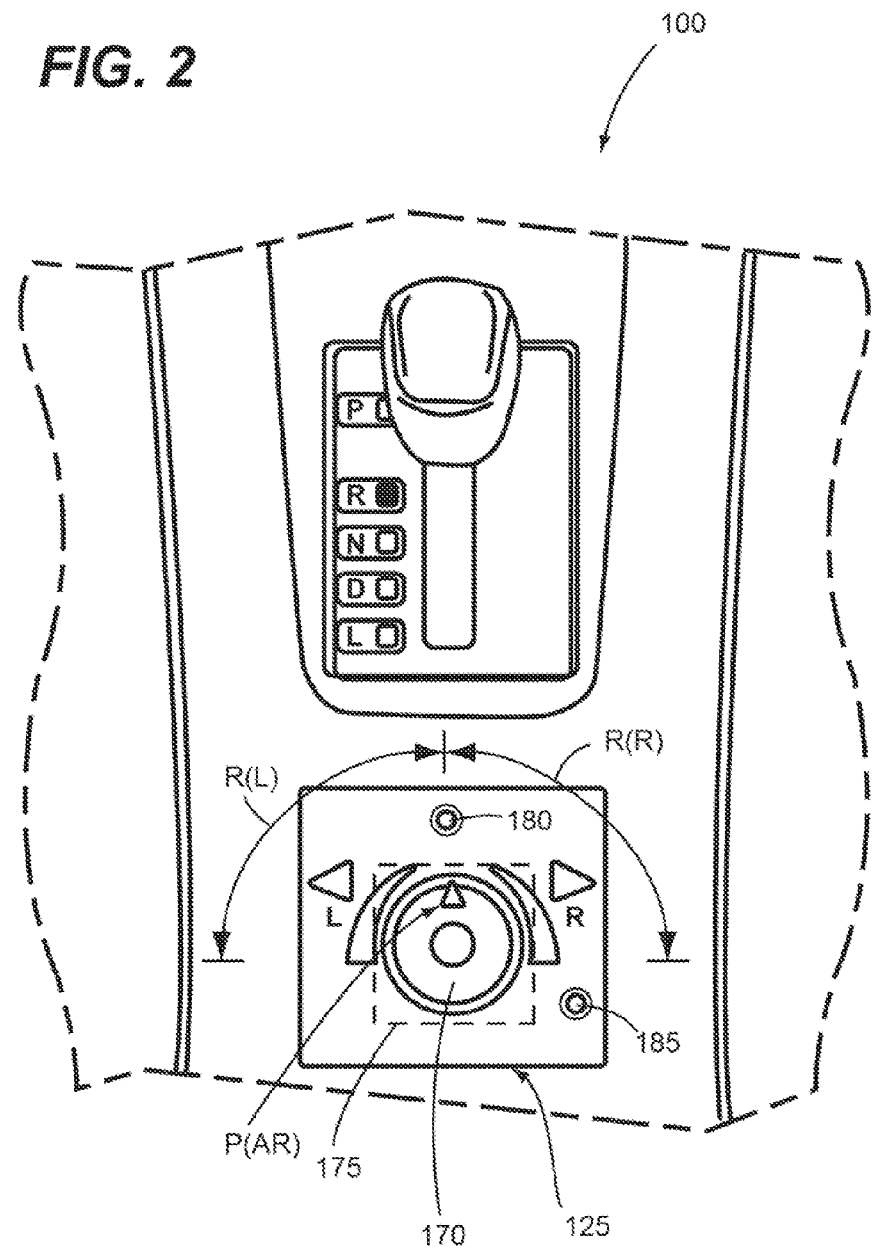
FIG. 2 shows a preferred embodiment of the trailer backup steering input apparatus discussed in reference to FIG. 1.

Referring now to FIG. 2, a preferred embodiment of the trailer backup steering input apparatus 125 discussed in reference to FIG. 1 is shown. A rotatable control element in the form of a knob 170 is coupled to a movement sensing device 175. In a preferred embodiment, the rotatable control knob 170 and movement sensing device 175 may be integrated into the vehicle instrument panel, as part of a gear shift indicator panel as shown. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 110 is backed along a substantially straight path as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each correspond to a respective movement sensing device signal indicating a tightest radius of curvature (i.e., most acute trajectory) of a path of travel of the trailer 110 that is possible without the corresponding vehicle steering information causing a jack-knife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion P(L), P(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to dictate a path of travel for the trailer 110 to follow and returns the knob 170 to the at-rest position P(AR) for causing the trailer 110 to be backed along a straight line. Accordingly, in embodiments of trailer backup assist systems where the steering wheel remains physically coupled to the steerable wheels of a vehicle during backup of an attached trailer, a rotatable control element configured in accordance with the inventive subject matter (e.g., the knob 170) provides a simple and user-friendly means of allowing a driver of a vehicle to input trailer steering commands.

It is disclosed herein that a rotational control input device configured in accordance with embodiments of the inventive subject matter (e.g., the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is in of approaching the zero curvature commanding position, and the like.

It is also disclosed herein that embodiments of the inventive subject matter can be configured with a control input device that is not rotational (i.e., a non-rotational control input device). Similar to a rotational control input device configured in accordance with embodiments of the inventive subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs path of travel commands, a button that is translatable along an axis for allowing a driver to input path of travel commands, and the like.

The trailer backup steering input apparatus 125 can be configured to provide various feedback information to a driver of the vehicle 100. Examples of situation that such feedback information can indicate include, but are not limited to, a status of the trailer backup assist system 105 (e.g., active, in standby (e.g., when driving forward to reduce the trailer angle), faulted, inactive, etc), that a curvature limit has been reached (i.e., maximum commanded curvature of a path of travel of the trailer 110), etc. To this end, the trailer backup steering input apparatus 125 can be configured to provide a tactile feedback signal (e.g., a vibration through the knob 170) as a warning if any one of a variety of conditions occur. Examples of such conditions include, but are not limited to, the trailer 110 having jack-knifed, the trailer backup assist system 105 has had a failure, the trailer backup assist system 105 or other system of the vehicle 100 has predicted a collision on the present path of travel of the trailer 110, the trailer backup system 105 has restricted a commanded curvature of a trailer's path of travel (e.g., due to excessive speed or acceleration of the vehicle 100), and the like. Still further, it is disclosed that the trailer backup steering input apparatus 125 can use illumination (e.g., an LED 180) and/or an audible signal output (e.g., an audible output device 185) to provide certain feedback information (e.g., notification/warning of an unacceptable trailer backup condition).

Figure 3:
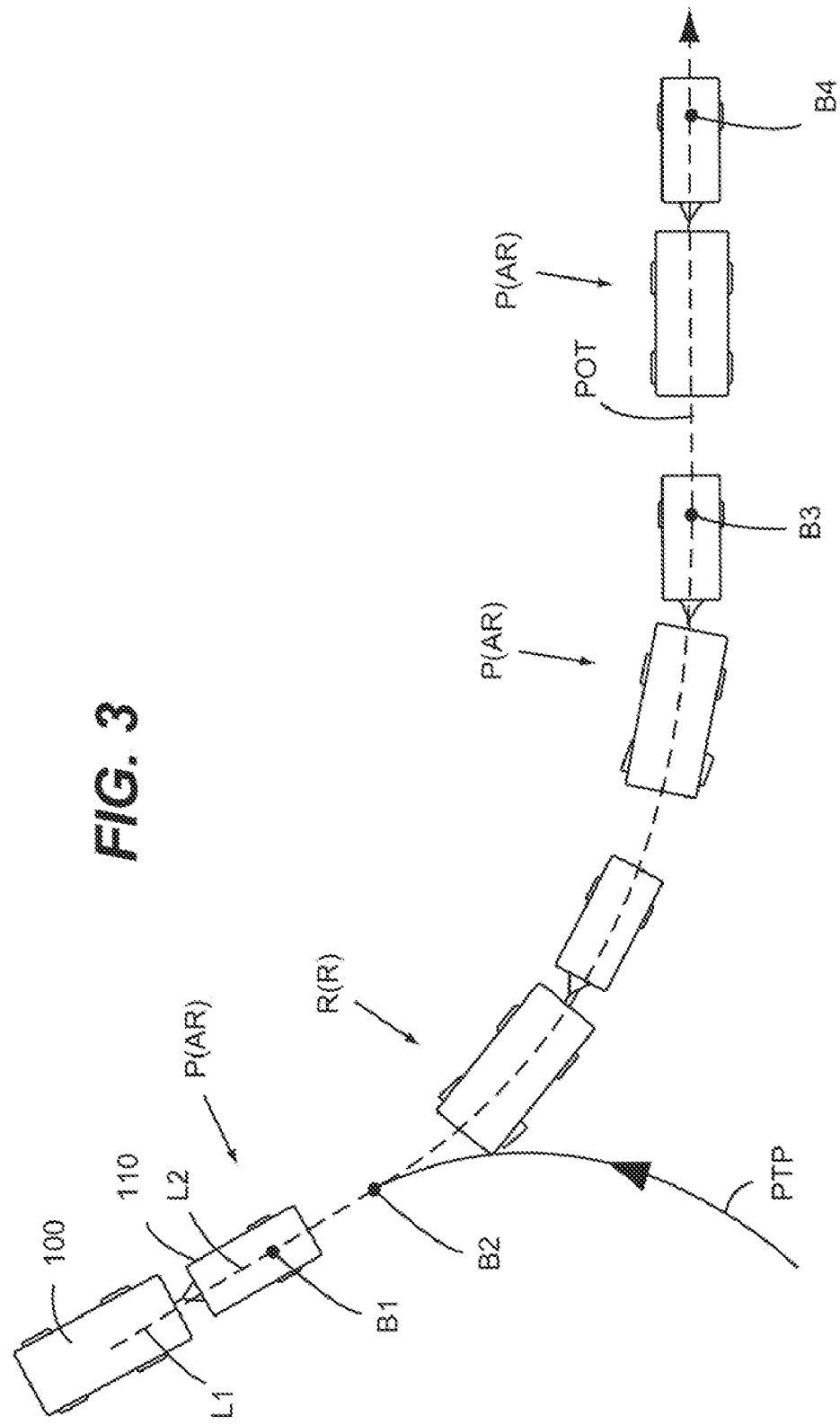
FIG. 3 shows an example of a trailer backup sequence implemented using the trailer backup steering input apparatus discussed in reference to FIG. 2.

Referring now to FIGS. 2 and 3, an example of using the trailer backup steering input apparatus 125 for dictating a path of travel (POT) of a trailer (i.e., the trailer 110 shown in FIG. 1) while backing up the trailer with a vehicle (i.e., the vehicle 100 in FIGS. 1 and 2) is shown. In preparation of backing the trailer 110, the driver of the vehicle 100 drives the vehicle 100 forward along a pull-thru path (PTP) to position the vehicle 100 and trailer 110 at a first backup position B1. In the first backup position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system configured in accordance with the inventive subject matter.

After activating the trailer backup assist system 105 (e.g., before, after, or during the pull-thru sequence), the driver begins to back the trailer 110 by reversing the vehicle 100 from the first backup position B1. So long as the knob 170 of the trailer backup steering input apparatus 125 remains in the at-rest position P(AR), the trailer backup assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second backup position B2, the driver rotates the knob 170 to command the trailer 110 to be steered to the right (i.e., a knob position R(R)). Accordingly, the trailer backup assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer backup assist system 105 steers the vehicle 100 as necessary for causing the trailer 110 to be backed along this substantially straight path to the fourth backup position B4. In this regard, arcuate portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

Figure 4:
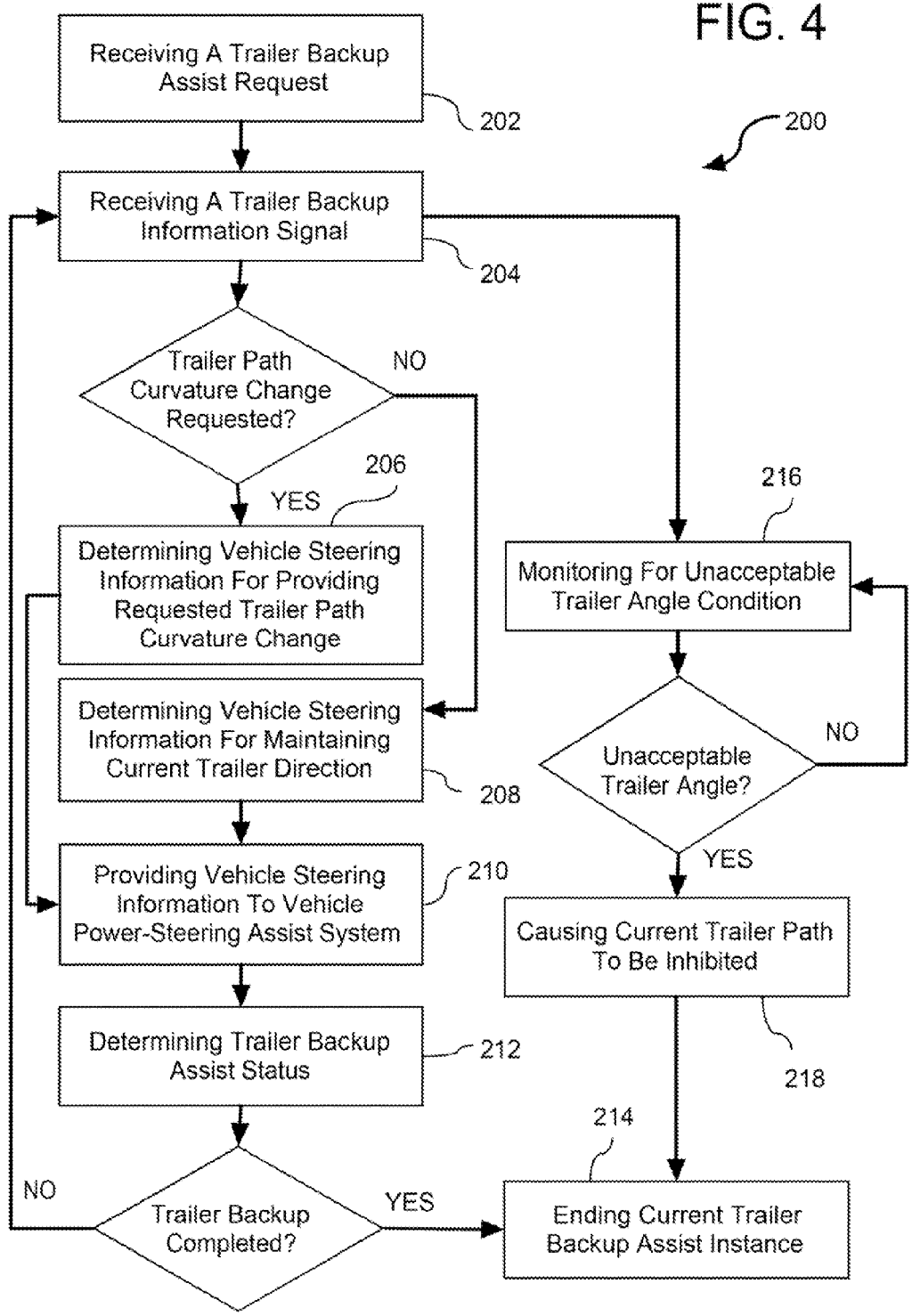
FIG. 4 shows a method for implementing trailer backup assist functionality in accordance with an embodiment of the inventive subject matter.

FIG. 4 shows a method 200 for implementing trailer backup assist functionality in accordance with an embodiment of the inventive subject matter. In a preferred embodiment, the method 200 for implementing trailer backup assist functionality can be carried out using the trailer backup assist architecture discussed above in reference to the vehicle 100 and trailer 110 of FIG. 1. Accordingly, trailer steering information is provided through use of a rotational control input device (e.g., the knob 170 discussed in reference to FIG. 2).

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but is not limited to, information from the trailer backup steering input apparatus 125, information from the hitch angle detecting apparatus 130, information from the power-steering assist control module 135, information from the brake system control module 145, and information from the powertrain control module 150.

If the trailer backup information signal indicates that a change in curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power-steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving railer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer backup assist instance, the vehicle having to be pulled forward to begin another trailer backup assist instance, etc), the method 200 will continually be performing the operations for receiving the trailer backup information signal, determining the vehicle steering information, providing the vehicle steering information, and determining the trailer backup assist status.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold is exceeded, assessing a backup speed to determine if a backup speed threshold is exceeded, assessing vehicle steering angle to determining if a vehicle steering angle threshold is exceeded, and the like. If it is determined that an unacceptable trailer backup condition exists, an operation 218 is performed for causing the current path of travel of the trailer to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable trailer angle condition is impending or approaching. In one example, if such feedback results in the unacceptable trailer angle condition being remedied prior to achieving a critical condition, the method can continues with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed for controlling movement of the vehicle to correct or limit a jackknife condition (e.g., steering and/or decelerating the vehicle to preclude the hitch angle from being exceeded).

Referring now to instructions processible by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. In one specific embodiment, the instructions are tangibly embodied for carrying out the method 200 disclosed and discussed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer backup assist functionality in accordance with the inventive subject matter.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A steering input apparatus for a trailer backup assist system, comprising:
   a control element manually operable while the trailer reverses to a select position of a plurality of commanding positions, including a zero curvature position and two positions in two opposing ranges of motion that directionally oppose the zero curvature position; and
   a control module generating a vehicle steering command based on a commanded trailer path corresponding to the select position of the control element, wherein the steering command is a curvature command that controls a path of the trailer to follow a predetermined curvature based on the select position of the control element while reversing the trailer.

2. The steering input apparatus of claim 1, wherein the control element includes a knob rotatable to the plurality of commanding positions for providing the commanded trailer path.

3. The steering input apparatus of claim 2, wherein the knob is biased to the zero curvature position and rotatable in opposing directions from the zero curvature position to the two positions to provide clockwise and counter-clockwise curved commanded trailer paths, respectively.

4. The steering input apparatus of claim 1, wherein the vehicle steering command is determined based on the commanded trailer path and a hitch angle sensed between a trailer and a vehicle having the trailer backup assist system.

5. The steering input apparatus of claim 4, wherein the commanded trailer path corresponding to the zero curvature position directs the trailer along a straight rearward path defined by a longitudinal centerline axis of the trailer, and wherein the two positions correspond to commanded curvature of a path of the trailer while reversing the trailer.

6. The steering input apparatus of claim 4, wherein the generated vehicle steering command causes the trailer to travel on the commanded trailer path.

7. A backup assist system for a vehicle reversing a trailer, comprising:
   an input device having a control element movable in two opposing ranges of motion to a first position providing a zero curvature command defined by a longitudinal centerline axis of the trailer and at least two additional positions providing curvature commands in opposing directions relative to the zero curvature command; and
   a control module generating a steering command for the vehicle based on a commanded curvature of the trailer provided by the control element, wherein the commanded curvature controls a path of the trailer to follow a predetermined curvature based on a select position of the input device while reversing the trailer.

8. The backup assist system of claim 7, further comprising:
   a camera-based apparatus sensing a hitch angle between the vehicle and the trailer, wherein the steering command is determined based on the commanded curvature and the hitch angle.

9. The backup assist system of claim 7, further comprising:
   a steering system of a vehicle autonomously adjusting a steering angle of steered wheels of the vehicle based on the generated steering command, causing the trailer to travel on the commanded curvature.

10. The backup assist system of claim 7, wherein the control element includes a rotatable knob positionable within opposing rotational ranges of positions relative to the first position for providing the commanded curvature.

11. The backup assist system of claim 10, wherein a first one of the opposing rotational ranges of positions is substantially equal to a second one of the opposing rotational ranges of positions.

12. The backup assist system of claim 7, wherein the control element includes a knob biased to the first position and movable in opposing directions from the first position to the at least two additional positions.

13. The backup assist system of claim 12, wherein the at least two additional positions provide clockwise and counter-clockwise curvature commands in opposing directions from the first position.

14. The backup assist system of claim 7, wherein the zero curvature command directs the trailer along a path defined by a longitudinal centerline axis of the trailer.

15. A method, comprising:
   providing a control element movable to a select position of a first position providing a zero curvature command defined by a longitudinal centerline axis of the trailer and movable in two opposing ranges of motion to second and third positions providing curvature commands in opposing directions from the zero curvature command;

sensing a hitch angle between a vehicle and a trailer; and generating a steering command for the vehicle based on the hitch angle and a commanded curvature of the trailer provided by the control element, wherein the commanded curvature controls a path of the trailer to follow a predetermined curvature based on the select position while reversing the trailer.

16. The method of claim 15, further comprising:

autonomously adjusting a steering angle of steered wheels of the vehicle with a steering system of the vehicle based on the generated steering command.

17. The method of claim 15, wherein the control element includes a knob rotatable within opposing ranges of positions relative to the first position for providing the commanded curvature, and wherein a first one of the opposing ranges of positions includes the second position and a second one of the opposing ranges of positions including the third position.

18. The method of claim 17, wherein the opposing rotational ranges of positions are substantially equal to each other.

19. The method of claim 15, wherein the control element includes a knob biased to the first position and movable in opposing directions from the first position to the second and third positions.

20. The method of claim 15, wherein the second and third positions provide clockwise and counter-clockwise commanded curvatures, respectively, and wherein the zero curvature command directs the trailer along a path defined by a longitudinal centerline axis of the trailer.

* * * * *